July 28, 1964  C. DOMENIGHETTI  3,142,191
ROAD TAMPING MACHINE
Filed Sept. 13, 1955
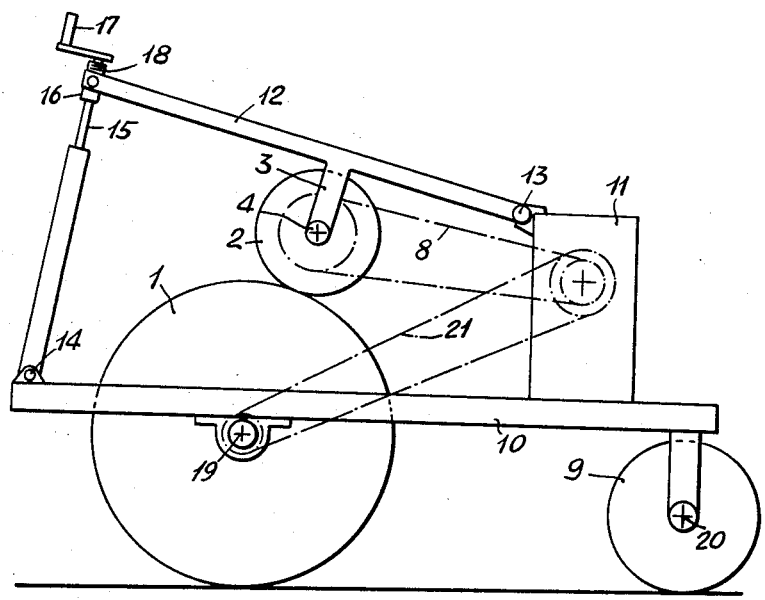
INVENTOR
Costante Domenighetti
BY A. John Michel
ATTORNEY 3,142,191
ROAD TAMPING MACHINE
Costante Domenighetti, Piazza Giulio Cesare 20,
Milan, Italy
Filed Sept. 13, 1955, Ser. No. 534,138
Claims priority, application Switzerland Jan. 10, 1955
4 Claims. (Cl. 74—213)

The present invention relates to road tamping machines, and more particularly to improvements in their power transmission which heretofore has been effected through belts and gearing or else by friction.

In compressor rollers the driving wheel was actuated by means of chains or gears, and this system has presented no inconvenience so long as the rotating organs of the compressor rollers behaved like the wheels of any ordinary vehicle.

In modern road rollers, on the contrary, the large wheel that has to compress the ground, is also vibrating at high speed, and its vibrations are also transmitted to the gears or chains, hampering a good operation of the transmission and stressing these parts in such a manner as to quickly provoke their breakage.

After many tests it has been found that the inconveniences deriving from the transmission of vibrations are wholly eliminated if the transmission of power is effected by means of wheels with elastic tires.

The wheels used in this transmission can either be single or multiple and mounted either in parallel in order to increase engagement or one following the other for constituting a wheel train, and, if desired, with differing diameters, so as to be able to realize a multiplication or a reduction according to necessity, as is done with known gear trains.

According to the invention, a road tamping machine is provided with means for adjusting the engagement or disengagement of the element to which it is desired to transmit power, as well as the pressure intensity for suitably varying the engagement.

The annexed drawing schematically represents the basic principle of the present invention.

The single figure of the drawing schematically shows a road tamping machine with a compressor roller 1 mounted upon a main frame 10. The shaft 19 of roller 1 is journaled in and at one end of the main frame while the wheel 9 has a shaft 20 journaled in and at the other end of the main frame. On the frame 10 is mounted a motor 11 which is drivingly connected with shaft 4 of the elastic tire 2 by transmission belt or chain 8. Tire 2 rotating around the shaft 4 is mounted on an arm 3 connected to a lever 12 swingably connected at 13 to the motor body 11 at one end, while it is anchored at the other end to the frame 10 by means of a threaded rod 15 whose lower end is anchored on the frame 10. The rod is adjustably threaded in an internally threaded collar 16 fixed to the other end of lever means 12. The threaded rod 15 can be caused to rotate around its own axis by means of a crank 17 to adjust by hand the pressure of the elastic tire 2 upon the surface of the drum 1. Around the rod 15 a helicoidal spring 18 can be disposed, which together with means for fixing the different positions of the crank 17 after the pressure has been adjusted, ensures the stabilization of adherence to the desired value.

The motor 11 is drivingly connected with shaft 19 of roller 1 by means of belt or chain 21.

The lever means 12 with its arm 3 constitutes a supporting means for the tire 2 which is disposed above the vibratory roller 1 and may be selectively moved against the mantle of the roller by turning crank 17. If desired, a plurality of elastic tires may be mounted on axle 4.

What I claim is:

1. In a road tamping machine comprising a rigid main frame having two ends; a vibratory compressor roller adapted to tamp road surface material and having a shaft journaled in and at one end of said main frame; wheel means having shaft means journaled in and at the other end of said main frame; and motor means mounted on said main frame at one side of said roller and drivingly connected to the shaft of the vibratory roller: the combination of at least one elastic tire disposed above and selectively movable against said roller; supporting means for each tire comprising lever means connected with each tire and having one end swingably connected to said motor means and another end; and means for adjustably connecting the other end of said lever means to the main frame at the other side of said roller whereby each tire transmits a part of the weight of said motor means and of said main frame to said roller.

2. The combination in a road tamping machine as set forth in claim 1, wherein said tire supporting means comprises a rod having a lower end anchored in the main frame at the other side of said roller, and a threaded collar fixed to the other end of said lever means and vertically adjustable along said rod.

3. The combination in a road tamping machine as set forth in claim 2, further comprising a driving connection between said motor and at least one tire whereby each driven tire transmits rotation by friction to said roller and drives the same.

4. In a road tamping machine comprising a frame; a vibrating roller having a mantle and a shaft mounted in said frame; and motor means mounted on said frame and operatively connected with the roller for vibrating the same: the combination of at least one elastic tire movably mounted on said frame and on said motor means and disposed above said roller; and means for selectively moving said tire toward and into engagement with the mantle of said roller for at least partially transmitting to the latter the weight of said frame and said motor means.

References Cited in the file of this patent
UNITED STATES PATENTS

| | | |
|---|---|---|
| 353,335 | Van Depoele | Nov. 30, 1886 |
| 828,713 | Coffman et al. | Aug. 14, 1906 |
| 1,754,172 | Lusse | Apr. 8, 1930 |
| 2,027,303 | Hacker | Jan. 7, 1936 |
| 2,036,247 | Winther | Apr. 7, 1936 |
| 2,283,863 | Achterman | May 19, 1942 |
| 2,506,686 | Sanders et al. | May 9, 1950 |
| 2,671,386 | Kerridge | Mar. 9, 1954 |
| 2,717,654 | Andersen | Sept. 13, 1955 |
| 2,750,166 | Polak | June 12, 1956 |
| 2,861,643 | Wald et al. | Nov. 28, 1958 |

FOREIGN PATENTS

| | | |
|---|---|---|
| 782,851 | France | Mar. 25, 1935 |
| 555,245 | Great Britain | Aug. 12, 1943 |